United States Patent
Kamppila

(10) Patent No.: US 7,195,439 B2
(45) Date of Patent: Mar. 27, 2007

(54) TIGHTENING MEMBER

(75) Inventor: Kauko Kamppila, Järvenpää (FI)

(73) Assignee: Metso Paper, Inc., Helsinki (FI)

( * ) Notice: Subject to any disclaimer, the term of this patent is extended or adjusted under 35 U.S.C. 154(b) by 166 days.

(21) Appl. No.: 10/503,801

(22) PCT Filed: Feb. 5, 2003

(86) PCT No.: PCT/FI03/00090

§ 371 (c)(1),
(2), (4) Date: Dec. 16, 2004

(87) PCT Pub. No.: WO03/067103

PCT Pub. Date: Aug. 14, 2003

(65) Prior Publication Data

US 2005/0089386 A1    Apr. 28, 2005

(30) Foreign Application Priority Data

Feb. 7, 2002 (FI) .................................. 20020258

(51) Int. Cl.
*F16B 37/08* (2006.01)
(52) U.S. Cl. ................ 411/434; 411/14.5; 411/917; 411/916; 411/915
(58) Field of Classification Search ............... 411/434, 411/14.5, 915–917
See application file for complete search history.

(56) References Cited

U.S. PATENT DOCUMENTS

| | | | |
|---|---|---|---|
| 2,571,265 A | 10/1951 | Leufvén | |
| 3,947,948 A | 4/1976 | Fredriksson et al. | |
| 4,075,923 A * | 2/1978 | Latham | 411/378 |
| 4,611,351 A * | 9/1986 | Nakamura | 384/99 |
| 4,725,176 A * | 2/1988 | Connolly et al. | 411/427 |
| 5,046,906 A | 9/1991 | Bucknell | |
| 5,118,237 A * | 6/1992 | Wright | 411/433 |
| 5,253,967 A * | 10/1993 | Orban et al. | 411/432 |
| 5,468,106 A * | 11/1995 | Percival-Smith | 411/434 |
| 5,505,465 A * | 4/1996 | Hornsby | 277/374 |
| 5,553,982 A * | 9/1996 | Hashikawa | 411/14 |
| 5,857,783 A * | 1/1999 | Johansson et al. | 384/556 |
| 6,352,397 B1 * | 3/2002 | O'Quinn et al. | 411/434 |

(Continued)

FOREIGN PATENT DOCUMENTS

DE    1 400 880    8/1972

(Continued)

OTHER PUBLICATIONS

International Search Report issued in PCT/FI03/00090.
International Preliminary Examination Report issued in PCT/FI03/00090.

*Primary Examiner*—Katherine Mitchell
(74) *Attorney, Agent, or Firm*—Stiennon & Stiennon

(57) ABSTRACT

A hydraulic nut having a first part connected around the first end of a fixing member the first part having an annular recess which opens to receive a second part forming an annular member which fits within the annular recess, wherein a pressurized medium chamber is defined between the second part and the annular recess. The second part has an annular portion which extends longitudinally away from the first part. The annular portion has an outer surface which is spaced radially inwardly to form a locking part recess. A locking part is placed within the locking part recess, and has an inner diameter which is threadedly engaged with the second part outer surface. The locking part has a surface facing the first part first surface, and movable by the threaded engagement with the second part to an abutment with the first part first surface.

18 Claims, 2 Drawing Sheets

U.S. PATENT DOCUMENTS

| | | |
|---|---|---|
| 6,594,993 B1 * | 7/2003 | Friedrichsen et al. .......... 60/442 |
| 7,063,490 B2 * | 6/2006 | Ricker ........................ 411/14 |
| 2005/0089386 A1 * | 4/2005 | Kamppila .................. 411/434 |

FOREIGN PATENT DOCUMENTS

| | | |
|---|---|---|
| DE | 72223731 | 2/1973 |
| EP | 0 609 924 A1 | 8/1994 |
| GB | 1 382 192 | 1/1975 |
| GB | 2 267 994 A | 12/1993 |
| GB | 2 299 641 A | 10/1996 |
| SU | 765532 | 9/1980 |
| WO | WO 03/067103 A1 | 8/2003 |

* cited by examiner

TIGHTENING MEMBER

CROSS REFERENCES TO RELATED APPLICATIONS

This application is a U.S. National Stage application of International application PCT/FI03/00090, which was filed on Feb. 5, 2003, and claims priority on Finnish Application No. 20020258, which was filed on Feb. 7, 2002.

STATEMENT AS TO RIGHTS TO INVENTIONS MADE UNDER FEDERALLY SPONSORED RESEARCH AND DEVELOPMENT

Not applicable.

BACKGROUND OF THE INVENTION

Pre-tensionable bolts are previously known, which can be provided with a strain by means of a pressurized medium chamber arranged at one end of the bolt, after which it is possible to tighten a tightening member at the opposite end of the bolt. Such arrangements, for example, in connection with bolts intended for joining two elements, are presented e.g. in GB patent 1 382 192 and in DE publication 24 58 810. This latter publication also presents a traction means which is screwed around one end of a fixing means and comprises two parts, between which there is a space where pressurized medium is introduced and which traction means is, in the final joint, replaced with an ordinary nut.

Pre-tensioning arrangements of prior art have required a particular chamber structure which is screwed or joined by a quick coupling at the end of an elongated fixing means, such as a bolt. To perform the pre-tensioning, an axial bore is also needed inside the bolt as well as a power-transmitting rod placed therein, whose end forms a piston of the pressurized medium chamber which is acted upon to provide the pre-tensioning.

A simpler arrangement for providing the strain required by the pre-tensioning in an elongated fixing means for joining two elements is presented in the publication GB 2267944. This document discloses a tightening member, a "hydraulic nut", which, on one hand, is fixed at the end of the elongated fixing means, provided with an outer threading, by means of a corresponding inner threading, and, on the other hand, abuts at its front surface on the surface of the first element to be joined. The tightening member is formed of three parts in such a way that the first part is fixed to the fixing means in a way transmitting power in the longitudinal direction, and the second part abuts at its front surface on one of the elements to be joined. The pressure of the pressurized medium can be introduced between the first and the second parts. The pressure is used to make the parts move farther away from each other, wherein the fixing means is stretched. The parts can be locked in this position by means of a third part which is effective therebetween and which is transferred to a locking position, after which the pressure can be removed.

In the arrangement presented in the publication, the second part which abuts the element to be joined, is locked to be axially immobile in relation to the first part by means of an annular locking part which is screwed by screw threads around the first part and which abuts, by its front surface facing the element to be joined, on the second part. The second part is thus placed underneath the first part and the locking part, joined together. So that the diameter of the tightening member could be reduced from the arrangement of prior art as presented in FIG. 1 of the GB document, the inner wall of the pressurized medium chamber in the first part is made thin and flexible elastically by the effect of the pressure in the chamber against the outer surface of the elongated fixing means.

Although the outer surface of the fixing means, according to the document, supports the inner wall against any further deflection caused by problems of tightness, this thinner inner wall is, however, the weak point in the structure and a potential cause of problems in the tightness for the pressurized medium.

SUMMARY OF THE INVENTION

It is an aim of the invention to present a novel arrangement in which the diameter of the hydraulic nut can be reduced without potential weak points in view of the tightness of the pressurized medium chamber. To attain this purpose, the tightening member according to the invention is primarily characterized in what will be presented in the characterizing part of the appended claim 1.

In the invention, it is possible to achieve, by the method known from the publication GB 2267944, a strain in the fixing means with the same tightening member by which the joint between the two parts is tightened. There is no need for separate pre-tensioning devices or parts to be removed after pre-tensioning. Because the locking part is placed around the second part and underneath the first part (when the first end of the tightening member is considered to be "up"), the whole diameter of the tightening member can still be kept small, without a need to form the inner wall of the pressurized medium chamber thin, which is the result if the recess forming the pressurized medium chamber were transferred close to the fixing means in the radial direction so that the locking part with a reasonable diameter could be placed around the first part.

In the following, the invention will be described in more detail with reference to the appended drawings.

DESCRIPTION OF THE PREFERRED EMBODIMENTS

Figure 1:
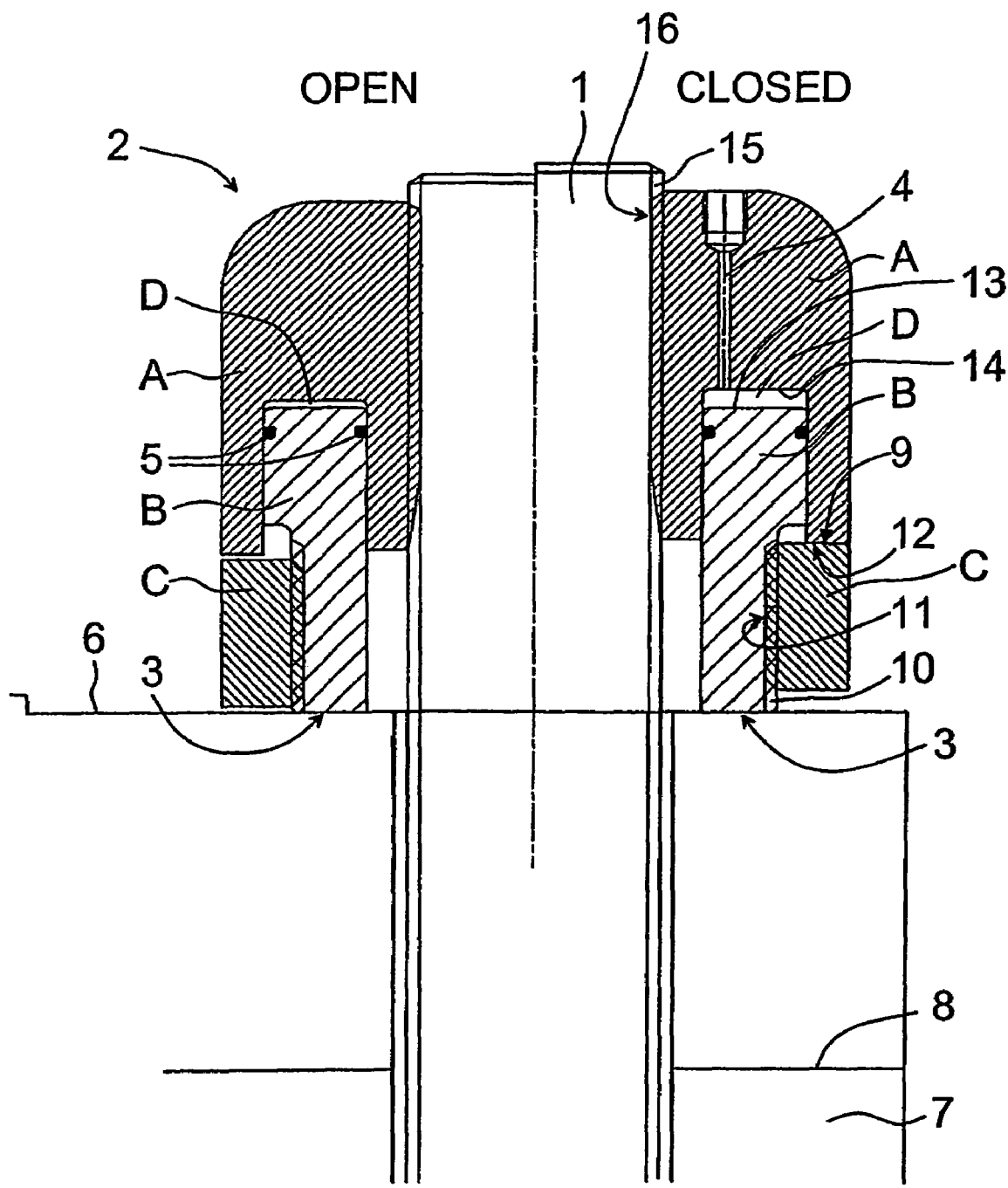
FIG. 1 shows a first embodiment of the invention in a longitudinal sectional view of the fixing means.

FIG. 1 shows a fixing means 1, which is inserted through two elements to be joined together, for example through bores made in the elements. The fixing means can be an ordinary stud bolt equipped with an outer thread, or the like. FIG. 1 shows the first element 6 to be joined and the second element 7 to be joined, and a joint plane 8 therebetween, through which the fixing means 1 is inserted. The elements 6, 7 can be joined together, for example, at their flange-like protrusions, through which the bores have been made. The elements may be some machine parts. At the opposite end of the fixing means 1, there is a part which abuts the second element to be joined and which at that point fixes the fixing means to be immobile in its longitudinal direction. This part, which may be an ordinary nut or a protrusion integrated in the fixing means, is not shown in more detail.

The tensioning means 2 screwed around the fixing means 1, close to its outermost end, comprises a first part A which is connected around the first end of the fixing means 1. This part can be connected to the outer thread 15 of the fixing means 1 by means of a suitable inner thread 16, and it can be moved by screwing in the axial direction. When the first part has been moved to a given position, it is capable of transmitting tensions in the axial direction to the fixing means 1, being immovable in relation to it in the axial direction, when subjected to a force effective in the longitudinal direction of the fixing means. The position of the first part A in the axial direction of the fixing means 1 can be changed only by rotating it on the outer thread 15 of the fixing means, i.e. by "screwing".

In addition, the tightening member 2 comprises a second part B which is separated from the fixing means 1, in an annular manner around it, between the first part A and the element 6. In this part B, there is an annular front surface 3 facing towards the second end of the fixing means 1, this surface abutting the first element 6 to be joined at a pressure determined by the tightening force. The front surface 3 is not necessarily directly laid against the first element 6 to be joined, but a washer or a corresponding piece can be provided between the front surface and the element. The front surface 3 is also in this case against the element 6 in the functional sense, because the washer, or the like, can be considered to be part of the element 6.

The first part A and the second part B may move in relation to each other in the axial (longitudinal) direction of the fixing means 1. The first part A and the second part B are shaped and placed in connection with each other in such a way that a pressurized medium chamber D is formed therebetween, having a volume dependent on said movement. FIG. 1 shows, on the left hand side, a situation in which the tightening member 2 is untightened, that is, the joint is "open". On the right hand side, the figure shows a situation in which pressure has been introduced into the pressurized medium chamber D via a channel 4 extending through the first part A into the pressurized medium chamber D in the axial direction; and as a result, the first part A is moved farther away from the second part B and, correspondingly, from the element 6 to be joined, on whose surface the second part B abuts at its front surface 3 either directly or indirectly. Because the first part A is screwed to be axially immovable around the end of the fixing means 1, the fixing means 1 is stretched. The substance to be introduced in the pressurized medium chamber D along the channel 4 may be a liquid, whose pressure can be used to make the first part and the second part move in the axial direction in relation to each other.

The first part A and the second part B are locked in the position shown on the right hand side in the figure by means of a third part, locking part C, effective therebetween. The locking part is placed axially immovably on the second part B, and it abuts, at its front surface 9 transverse to the axial direction, on the first part A, obstructing the movement of the part A in the axial direction by this front surface. In FIG. 1, this is implemented in such a way that the outer surface of the second part B is provided with an outer thread 10, on which the annular locking part C is screwed by its inner thread 11. Thanks to the matching screw threads 10, 11, the locking part can be screwed in the axial direction so that it abuts the front surface 12 of the first part A. After the locking part C has been screwed in contact with the front surface 12 of the first part A, the pressure can be removed from the pressurized medium chamber D, because the locking part C will remain in its position into which it has been transferred by screwing and will prevent the return movement of the first part A. The fixing means 1 will thus remain in a permanently stretched state and the joint will remain permanently tightened.

In FIG. 1, the first part A is closer to the outermost end of the fixing means 1, and the end of the second part B facing this outermost end of the fixing means is placed in an annular recess formed in the first part A, opening in the opposite direction towards the element 6 to be joined and towards the second end of the fixing means 1. The above-mentioned pressurized medium chamber D is formed between the bottom 14 of this annular recess and the front surface 13 of the end of the second part B. The axially outermost rim face of the collar-like outer wall of the recess forms the front surface 12 to come into abutment with the front surface 9 of the locking part C in the first part A. The locking part C is thus placed, in the axial direction, i.e. in the longitudinal direction of the fixing means 1, in the area between the first part A and the element 6 to be joined. The outer diameter of the periphery of the second part B, to which the locking part C is fixed, is dimensioned smaller than the outer diameter of the first part A, so that the locking part C, which comes around the second part, would not increase the outer diameter of the tightening member too much. The cylindrical outer surface of the locking part C may form an extension of the cylindrical outer surface of the part A in the direction of the element 6; that is, the diameters are equal. Futhermore, FIG. 1 shows that the second part B is narrowed inwards at its butt end, i.e. in the part on the side of the front surface 3, in which recess the annular locking part C is placed in such a way that the outer periphery of the locking part C will be approximately flush with the outer periphery of the first part A.

The pressurized medium chamber D can be sealed at its outer periphery and inner periphery (at the outer wall and inner wall of the recess) by means of annularly placed seals indicated with references 5 in FIG. 1. The seals 5 are placed in the second part B far from the opening of the recess of the first part A and closer to that front surface 13 of the end of the second part B which limits the pressurized medium chamber D. In general, the seals 5 can be placed in such a way that in the minimum volume position of the chamber D they are on the sliding surfaces farther away in the sliding direction from that end surface which would, if the chamber expanded too much, move past the seal, and closer to the end surface of that part to which they are connected. The distance from the seal 5 is greater to the end surface of the part moving in relation to the same than to the end surface of the part comprising the seal. If the seals 5 are fixed to the first part A, to the walls of the recess, they are thus closer to the front surface 12 of the part A.

As seen from FIG. 1, in the recess which forms the pressurized medium space D and to which the second part B is fitted in an axially slidable manner, the wall on the side of the fixing means 1, i.e. the inner wall, is placed against the outer surface of the fixing means 1; that is, it cannot bend inwards in the radial direction. The first part A is, on that section which is between the bottom of the recess and the opening of the recess at the level of the front surface 9, provided with an inner thread in the inner wall, that is, the inner thread 16 of the first part A extends, in the axial direction, also to the area of the recess, in which area the first part is screwed onto the outer thread 15 of the fixing means 1.

Figure 2:
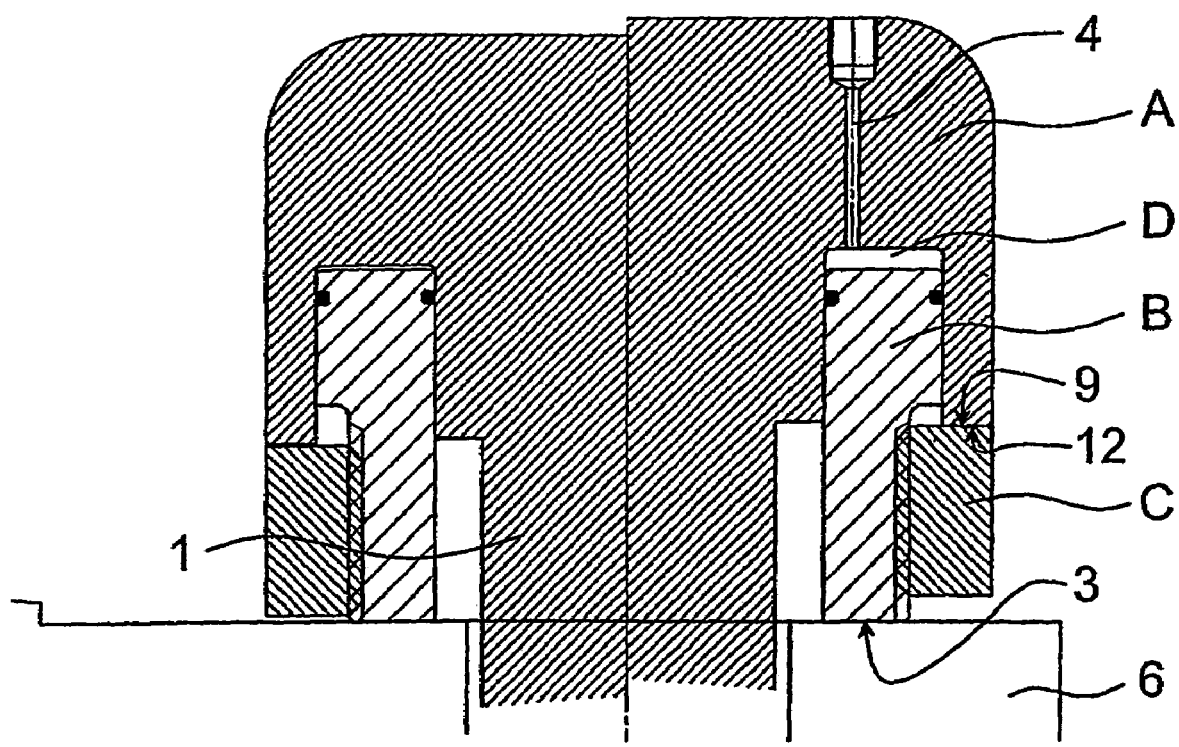
FIG. 2 shows a second embodiment of the invention in a longitudinal sectional view of the fixing means.

FIG. 2 shows an embodiment modified from the embodiment of FIG. 1, wherein the first part A is a part integrated in the fixing means 1, that is, it cannot be moved in relation to the fixing means in its axial direction. Compared with FIG. 1, the threaded joint between the fixing means 1 and the first part A is now replaced with a permanent connection, and the part A can be of the same piece as the fixing means 1, i.e., in a way, it forms the head of the bolt. In other respects, the shape and position of the part A in relation to the parts B and C, the shapes of the parts B and C, and the operating principle of all the three parts in the tightening and locking are quite the same as in FIG. 1, only with the exception that the position of the first part A before the tightening and locking is determined by the position of the whole fixing means 1.

The invention claimed is:

1. A tightening member which is fitted around a first end of an elongated fixing means defining a longitudinal direction, and extending through an element to be joined, the tightening member comprising:
   a first part which is fixed around the first end of the elongated fixing means in a manner which transmits tightening force, the first part having portions forming a front surface, which faces toward the second end of the elongated fixing means, and defining an outer diameter;
   a second part, a portion of the second part forming a second front surface of the tightening member adapted for abutment to the element to be joined, the second part being placed around the first end of the elongated fixing means, separate from the elongated fixing means, and between the first part and the element to be joined;
   a pressurized medium chamber formed between the first part and the second part;
   a locking part effective between the first part and the second part, the locking part having an annular shape defining an inner surface and positioned around the first end of the elongated fixing means and positioned between the first part and the element to be joined, and lockably connected to the second part by said inner surface, and the locking part having a surface transverse to the longitudinal direction of the elongated fixing means, engageable when in a locking position, in abutment with the front surface of the first part;
   wherein the second part has portions forming a first rearward surface facing toward the first end of the elongated fixing means, and having an outer wall defining an outer diameter and an inner wall defining an inner diameter, said first rearward surface of the second part being positioned in an annular recess formed in the first part, the recess having an inner wall, an outer wall, and a bottom, whereby the pressurized medium chamber is formed between said first rearward surface of the second part and the bottom of the recess; and
   wherein the outer diameter of the second part is smaller than the outer diameter of the first part, and wherein the locking part is lockable to the second part, said second part having a butt end proximate said element to be joined, wherein the butt end narrows inwardly forming a recess in which the locking part is placed with the locking part inner surface in direct engagement with the second part.

2. The tightening member of claim 1, wherein the first part is fixed by means of an inner thread to an outer thread at the first end of the elongated fixing means.

3. The tightening member of claim 2, wherein the locking part has an outer surface which forms an extension in the longitudinal direction towards the element to be joined, to an outer surface of the first part which outer surface defines the outer diameter of the first part.

4. The tightening member of claim 3 wherein the annular recess forms part of the pressurized medium chamber and the inner thread extends in the longitudinal direction to an area adjacent the inner wall of the recess in the first part so that the inner wall cannot bend inwards in a radial direction when the inner thread engages the outer thread at the first end of the elongated fixing means.

5. The tightening member of claim 3, wherein the inner surface of the locking part is threadedly engaged with the second part.

6. The tightening member of claim 2 wherein the annular recess forms part of the pressurized medium chamber and the inner thread extends in the longitudinal direction to an area adjacent the inner wall of the recess in the first part so that the inner wall cannot bend inwards in a radial direction when the inner thread engages the outer thread at the first end of the elongated fixing means.

7. The tightening member of claim 2, wherein the pressurized medium chamber is sealed by means of a seal disposed between the outer wall of the annular recess and the outer wall of the second part, and by a seal disposed between the inner wall of the annular recess and the inner wall of the second part.

8. The tightening member of claim 2, wherein the inner surface of the locking part is threadedly engaged with the second part.

9. The tightening member of claim 1, wherein the first part is integral to the first end of the elongated fixing means.

10. The tightening member of claim 9, wherein the pressurized medium chamber is sealed by means of a seal disposed between the outer wall of the annular recess and the outer wall of the second part, and by a seal disposed between the inner wall of the annular recess and the inner wall of the second part.

11. The tightening member of claim 1, wherein the locking part has an outer surface which forms an extension in the longitudinal direction towards the element to be joined, to an outer surface of the first part which outer surface defines the outer diameter of the first part.

12. The tightening member of claim 1, wherein the pressurized medium chamber is sealed by means of a seal disposed between the outer wall of the annular recess and the outer wall of the second part, and by a seal disposed between the inner wall of the annular recess and the inner wall of the second part.

13. The tightening member of claim 1, wherein the inner surface of the locking part is threadedly engaged with the second part.

14. A hydraulic nut comprising:
    a longitudinally extending fixing member, having a first end and a second end;
    a first part connected around the first end of the longitudinally extending fixing member which can be rendered immobile with respect to the longitudinally extending fixing member, the first part having portions forming an annular recess which opens toward the second end of the longitudinally extending fixing member, the annular recess defining an inner wall, an outer wall, and a bottom wall which form the annular recess, the first part defining an outer diameter and a first surface between the outer wall of the annular recess and the outer diameter, said first surface facing the second end of the longitudinally extending fixing member;
    a second part forming an annular member which has a portion which fits within the annular recess in the first part, the portion extending in a radial direction with respect to the longitudinally extending fixing member, between the inner wall and the outer wall of the annular recess, and wherein a pressurized medium chamber is defined between the portion and the annular recess, wherein the second part has an annular portion which extends longitudinally toward the second end of the longitudinally extending fixing member, and wherein said annular portion has an outer surface which is spaced radially inwardly of the outer wall of the annular recess, to form a locking part recess;

a locking part placed within the locking part recess, the locking part having an inner diameter which is threadedly engaged with the second part outer surface, the locking part having a surface facing the first part first surface, and movable by said threaded engagement with the second part to an abutment with the first part first surface.

15. The hydraulic nut of claim 14 wherein the first part is connected around the first end of the longitudinally extending fixing member, by being integral with the said longitudinally extending fixing member.

16. The hydraulic nut of claim 14 wherein the first part is threadedly connected around the first end of the longitudinally extending fixing member.

17. The hydraulic nut of claim 14 wherein the locking part does not extend radially beyond the first part.

18. The hydraulic nut of claim 14 wherein a threaded connection between the first part and the first end of the longitudinally extending fixing member extends in the longitudinal direction to an area adjacent the inner wall of the recess in the first part so that the inner wall cannot bend inwards in a radial direction.

* * * * *